(12) United States Patent
Hodge et al.

(10) Patent No.: US 10,927,904 B2
(45) Date of Patent: Feb. 23, 2021

(54) ONE-WAY CLUTCH ASSEMBLY WITH DUAL BEARINGS

(71) Applicant: SCHAEFFLER TECHNOLOGIES AG & CO. KG, Herzogenaurach (DE)

(72) Inventors: Michael Hodge, Creston, OH (US); James Copeland, Massillon, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 124 days.

(21) Appl. No.: 16/254,069

(22) Filed: Jan. 22, 2019

(65) Prior Publication Data

US 2020/0232524 A1    Jul. 23, 2020

(51) Int. Cl.
*F16D 41/066* (2006.01)
*F16D 41/06* (2006.01)

(52) U.S. Cl.
CPC .... *F16D 41/066* (2013.01); *F16D 2041/0605* (2013.01); *F16D 2041/0665* (2013.01)

(58) Field of Classification Search
CPC ........... F16D 2041/0601; F16D 41/066; F16D 41/067; F16D 41/08; F16D 41/06
See application file for complete search history.

(56) References Cited

U.S. PATENT DOCUMENTS

| | | | | |
|---|---|---|---|---|
| 3,251,442 | A | * | 5/1966 | Aschauer ............... F16D 47/04 192/48.3 |
| 5,842,548 | A | * | 12/1998 | Sato ....................... F16D 41/07 192/45.1 |
| 9,145,927 | B2 | | 9/2015 | Luipold et al. |
| 9,816,561 | B2 | | 11/2017 | Hodge |
| 2002/0060117 | A1 | * | 5/2002 | Nakamura .............. F16H 55/36 192/45.018 |
| 2006/0169559 | A1 | * | 8/2006 | Awaji ..................... F16D 41/06 192/41 R |
| 2007/0267264 | A1 | * | 11/2007 | Pederson ............. F16D 41/066 192/45.018 |
| 2016/0017936 | A1 | * | 1/2016 | Reimchen ............. F16D 41/067 192/45.004 |
| 2017/0067511 | A1 | * | 3/2017 | Capozzi .................. F16C 33/60 |
| 2017/0276194 | A1 | * | 9/2017 | Hodge .................. F16D 41/067 |

* cited by examiner

*Primary Examiner* — Ernesto A Suarez
*Assistant Examiner* — Lillian T Nguyen
(74) *Attorney, Agent, or Firm* — Brooks Kushman P.C.

(57) ABSTRACT

A clutch assembly includes inner and outer races supported for rotation about an axis and a one-way clutch element radially disposed between the inner and outer races. A first bearing is radially disposed between the inner and outer races and is seated on the inner race. A second bearing is radially disposed between the inner and outer races and is seated on the inner race. The first and second bearings are on opposite sides of the clutch element.

20 Claims, 3 Drawing Sheets

ONE-WAY CLUTCH ASSEMBLY WITH DUAL BEARINGS

TECHNICAL FIELD

The present disclosure relates to one-way clutch assemblies and more specifically to clutch assemblies having dual bearings.

BACKGROUND

A clutch is a device used to selectively couple components such as a pair of rotating shafts or the like. A clutch may also be used to ground a rotating component to a fixed structure such as a housing. Here, the clutch is typically referred to as a brake. Clutches may be bidirectional, lock in both directions, or one-way, lock in one direction and freewheel in the other. U.S. Pat. No. 9,145,927 is an example of a one-way clutch.

SUMMARY

According to one embodiment, a clutch assembly includes an inner race defining first and second axially spaced seats and an outer race circumscribing the inner race and defining third and fourth axially spaced seats. A one-way clutch element is radially disposed between the inner and outer races and is disposed on the first and third seats. A first bearing is disposed on the second and fourth seats. An annular spacer of the clutch assembly has an outer surface disposed on the third seat. The clutch further includes a second bearing disposed on the first seat and on an inner surface of the spacer.

According to another embodiment, a clutch assembly includes inner and outer races supported for rotation about an axis and a one-way clutch element radially disposed between the inner and outer races. A first bearing is radially disposed between the inner and outer races and is seated on the inner race. A second bearing is radially disposed between the inner and outer races and is seated on the inner race. The first and second bearings are on opposite sides of the clutch element.

According to yet another embodiment, a clutch assembly includes inner and outer races supported for rotation about an axis and a one-way clutch element radially disposed between the inner and outer races. A first bearing is radially disposed between the inner and outer races and is seated on the inner race. A second bearing is radially disposed between the inner and outer races. An annular spacer is radially stacked with the second bearing and engages with one of the inner and outer races.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
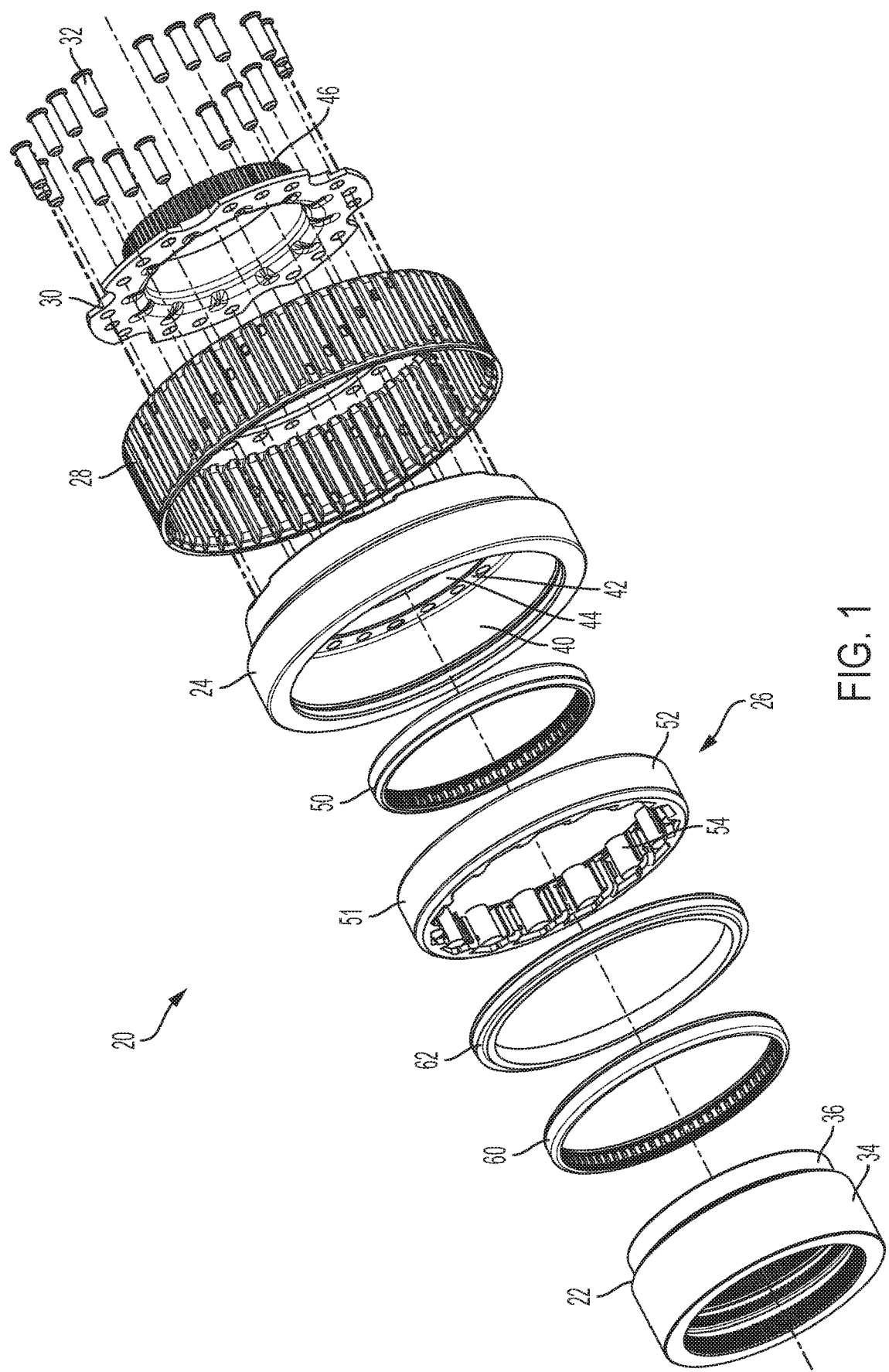
FIG. 1 is an exploded perspective view of a one-way clutch assembly.
Figure 2:
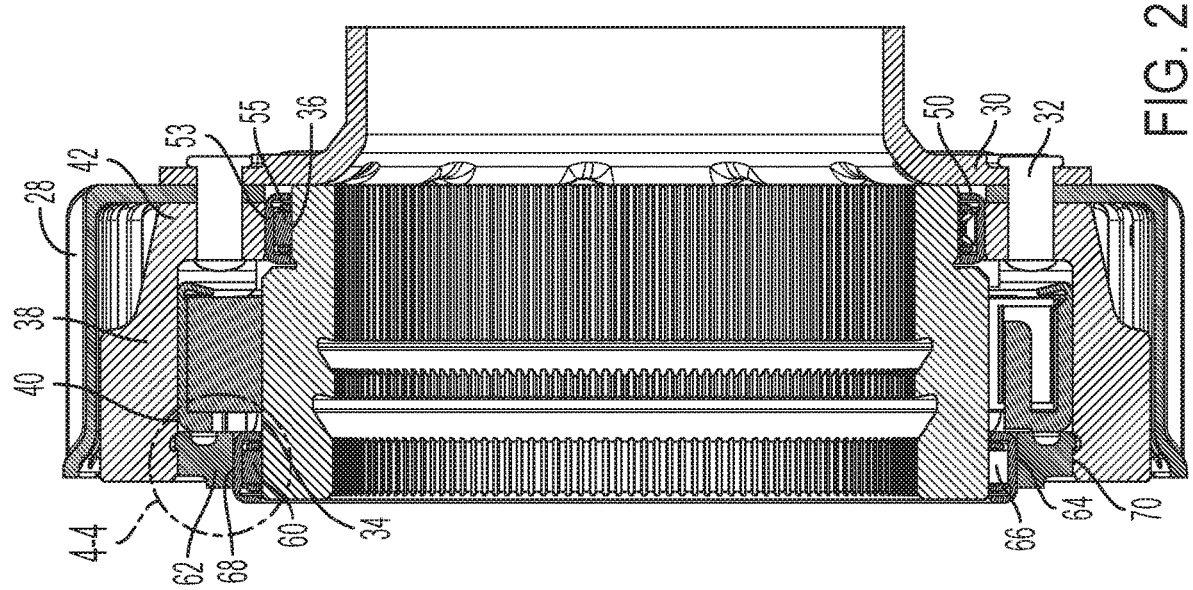
FIG. 2 is side cross-sectional view of the one-way clutch assembly.

Referring to FIGS. 1 and 2, a one-way clutch assembly 20 includes an inner race 22 and an outer race 24 supported for rotation about a common axis. The inner and outer races 22, 24 are operably coupled to either rotating components or to a rotating component and a fixed component. The assembly 20 may be referred to as a brake when utilized to ground a rotating component to a housing or other fixed structure. A one-way clutch element 26 is configured to selectively lock the inner and outer races 22, 24 relative to each other in a first direction of rotation and to permit relative rotation between the inner and outer races in a second direction of rotation (freewheel).

The inner race 22 includes an outer surface defining a first bearing seat 34 and a second bearing seat 36 that are axially spaced from each other. The first bearing seat 34 may be axially longer than the second seat 36, and the first seat 34 may have a larger diameter than the second seat 36. The outer race 24 includes an axially extending portion 38 having an inner surface defining a third seat 40 and a radially extending portion 42 that forms a hub of the outer race. The radially extending portion 42 defines an inner circumferential surface that forms a fourth bearing seat 44. The third bearing seat 40 may be axially longer than the fourth seat 44, and the third seat 40 may have a larger diameter than the fourth seat 44.

The outer race 24 is received in and fixed to a carrier 28. A drive hub 30 is attached to the carrier 28. For example, a plurality of rivets 32 may extend through the drive hub 30, the carrier 28, and the radially extending portion 42 of the outer race 24 to fix these three components together. The drive hub 30 may define an external spline 46 used to attach the clutch assembly 20 to a shaft, a gear, or other component.

A first bearing 50 is radially disposed between the inner and outer races 22, 24. The bearing 50 may include an outer race 53 disposed on the fourth seat 44 and a plurality of rollers 55 disposed on the second seat 36. The bearing 50 could also be inverted with an inner race disposed on the inner race 22 and rollers disposed against the outer race 24. The roller bearing 50 is but one example and other types of bearings may be used. The first bearing 50 may be interference fit (press fit) to the outer race 24.

Figure 3:
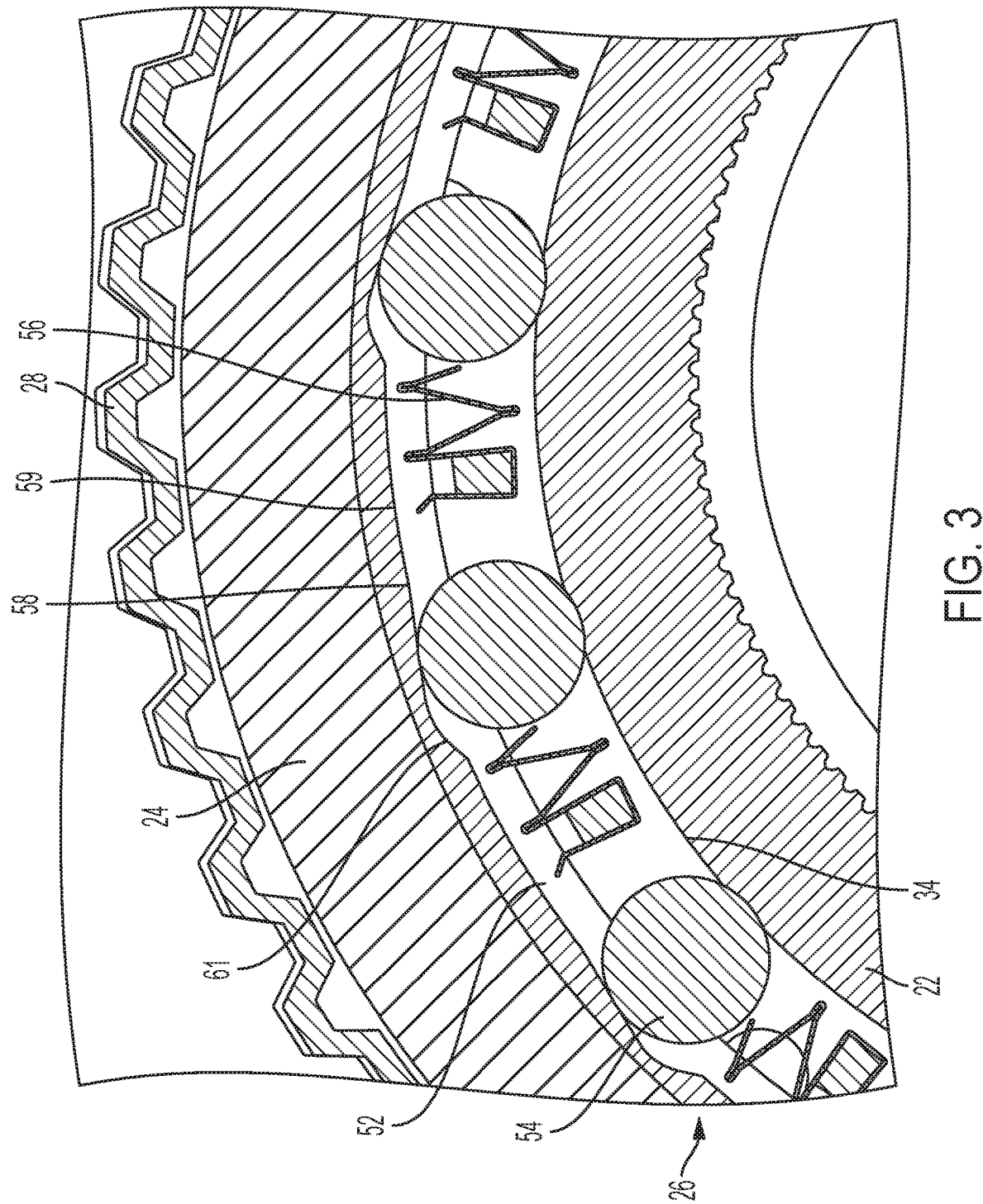
FIG. 3 is a front cross-sectional view of the one-way clutch assembly.

Referring to FIGS. 1, 2, and 3, the clutch element 26 is radially disposed between the inner and outer races 22, 24 and may be generally located at an axial midpoint of the inner race 22. The clutch element 26 may be disposed between the first seat 34 and the third seat 40. The clutch element 26 may include a cartridge 52 that supports a plurality of rollers 54 that are circumferentially arranged and rotatable relative to the cartridge 52. The cartridge 52 includes an outer surface 51 disposed on the third seat 40 of the outer race 24. The rollers 54 are received on the first seat 34 of the inner race 22.

The cartridge 52 has an inner surface 58 defining a plurality of ramps 59 circumferentially arranged around the inner surface 58. The ramps 59 extend radially inward in the clockwise direction when viewed from the perspective of FIG. 3. Pockets 61 are formed at the ends of the ramps 59 and are configured to receive the rollers 54 therein such that the rollers 54 do not contact the inner race 22 when received in the pockets 61. Springs 56 bias the rollers 54 out of the pockets 61 During operation of the clutch 20, rotation of the inner race 22 relative to the outer race 24 in the clockwise direction causes the rollers 54 to ride up the ramps 59 causing the clutch to lock, and rotation of the inner race 22 relative to the outer race 24 in the counterclockwise direction causes the rollers 54 to roll into the pockets 61 permitting slip between the cartridge 52 and the inner race 22. As the angular velocity of the outer race 24 increases during freewheeling, centrifugal force seats the rollers 54 within the pockets 61 and out of contact with the inner race 22, which reduces friction losses.

Single bearing clutch assemblies may have performance issues in certain applications in which centricity of the outer race is not tightly maintained. For example, external forces from mating components can cause wobble between the inner and outer races which could lead to clutch failure. As disclosed herein, this disclosure sets forth a clutch assembly that overcomes one or more of the performance issues of this prior-art clutch assembly. The improved clutch assembly of this disclosure, inter alia, includes a second bearing that may be disposed on the opposite side of the clutch element from the first bearing. This second bearing, in cooperation with the first bearing, inhibits wobble between the inner and outer races.

The improved clutch may also include a spacer associated with the second bearing to prevent loss of interference fit in the event that the outer race expands as the one-way clutch builds torque. The interference fit retains the second bearing in the clutch assembly, and a loss of interference can result in axial movement of the second bearing leading to clutch failure. As explained below in detail, the spacer includes a connection feature that engages with a connection feature of the outer race to maintain axial alignment of the second bearing when interference between the spacer and the outer race is reduced or lost.

Referring back to FIGS. 1 and 2, the clutch assembly 20 includes a second bearing 60 that may mitigate the effects of wobble or other external forces. The first bearing 50 and the second bearing 60 may be disposed on opposite sides of the clutch element 26. The second bearing 60 may include an outer race 64 and rollers 66. The rollers 66 are disposed on the first seat 34 adjacent to the clutch element 26. The second bearing 60 is circumscribed by a spacer 62. The outer race 64 of the bearing 60 is disposed against an inner surface 68 of the spacer 62. The bearing 60 may be interference fit to the spacer 62. The spacer 62 includes an outer surface 70 that is disposed on the third seat 40. An interference fit may be formed between the third seat 40 and the spacer 62. The spacer 62 may be formed of metal, such as powdered metal. In one embodiment, the spacer 62 is steel to match the steel of the outer race 24. Matching the material between the outer race 24 and the spacer 62 provides similar expansion rates and avoids galvanic corrosion.

Figure 4:
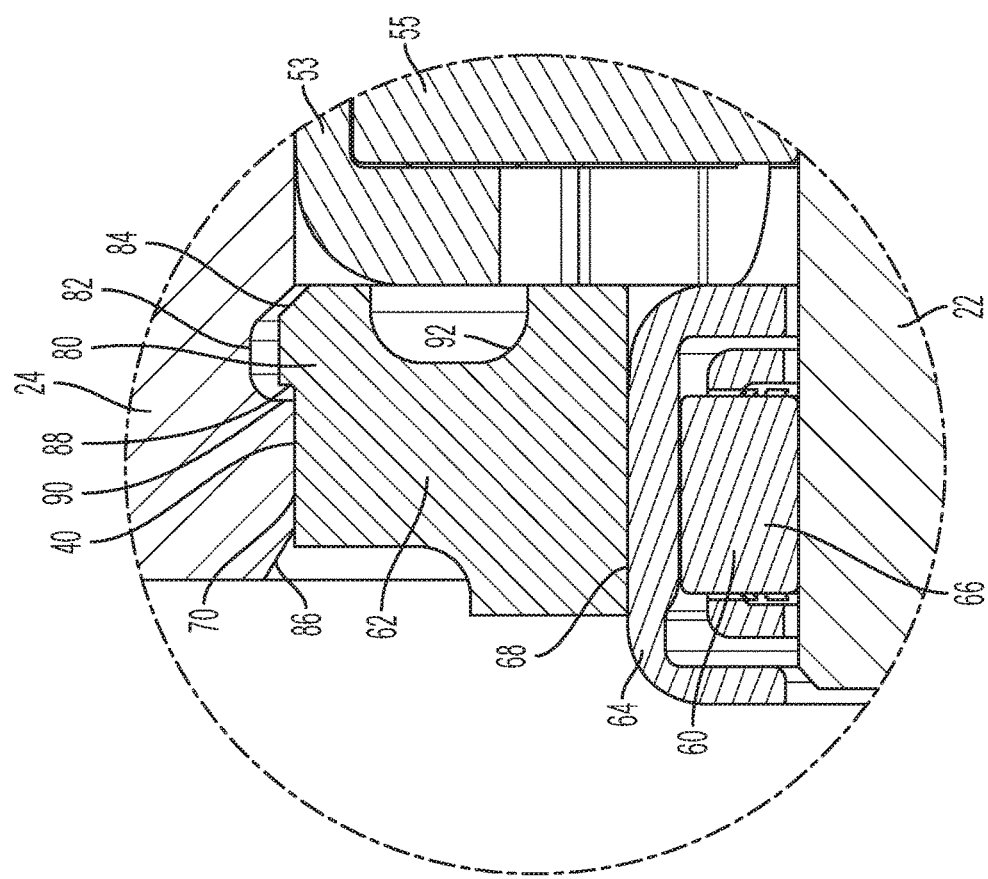
FIG. 4 is a magnified view of the clutch at area 4-4.

Referring to FIG. 4, the spacer 62 may include a connection feature that cooperates with a connection feature of the outer race 24 to maintain axial position of the spacer 62 in the event that the interference fit between the spacer 62 and the outer race is diminished or lost. In one embodiment, the spacers 62 include a projection 80 received within a groove 82 of the outer race 24, or spacer 62 may define a groove that receives a projection of the outer race 24. The projection 80 may extend radially outward from the outer surface 70 of the spacer 62. The groove 82 may be defined in the third seat 40. The projection 80 and the groove 82 may be annular. The projection 80 may include a chamfer 84, and the outer race 24 may define a chamfer 86 that cooperates with the chamfer 84 to ease insertion of the spacer 62. The projection 80 is configured to snap into the groove 82 when axially aligned. A barb 88 formed on the backside of the projection 80 engages with a radial wall 90 of the groove 82 to resist removal of the projection 80 from the groove 82. A channel 92 (optional) may be formed in the front side of the spacer 62. The channel 92 is used to control the deflection of the spacer 62 and is tunable parameter. In this instance, the spacer 62 is not axially centered with the rollers 66 and the channel 92 balances this offset.

In an alternative embodiment, the second bearing may circumscribe the spacer. The second bearing may have an inner race seated on the seat of the spacer and rollers riding on the outer race. An inner surface of the spacer is interference fit to the inner race. Connecting features are provided on the spacer and the inner race to retain the bearing if interference is lost.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 20 clutch assembly
22 inner race
24 outer race
26 one-way clutch element
28 carrier 30 drive hub
32 rivets
34 first seat
36 second seat
38 axially extending portion
40 third seat
42 radially extending portion
44 fourth seat
46 spline
50 first bearing
52 cartridge
53 outer race
54 rollers
55 rollers
56 springs
58 inner surface
59 ramps
60 second bearing
61 pocket
62 Spacer
64 outer race
66 rollers
68 inner surface
70 outer surface
80 hook
82 groove
84 chamfer
86 chamfer
88 barb
90 radial wall
92 channel

What is claimed is:

1. A clutch assembly comprising:
an inner race defining first and second axially spaced seats, wherein the first seat has a continuous diameter;
an outer race circumscribing the inner race and defining third and fourth axially spaced seats, wherein the third seat has a continuous diameter and defines a circular groove radially recessed into the third seat and having a radially extending wall;
a one-way clutch element radially disposed between the inner and outer races and disposed on the first and third seats;
a first bearing disposed on the second and fourth seats;
an annular spacer including an outer surface disposed on the third seat and a projection extending radially outward from the outer surface and received within the groove, wherein the projection defines a radially extending barb engageable with the radially extending wall to form axial interference between the barb and the radial wall that prevents axial movement of the spacer; and
a second bearing disposed on the first seat and on an inner surface of the spacer.

2. The clutch assembly of claim 1, wherein the first and second bearings are on opposite sides of the clutch element.

3. The clutch assembly of claim 1, wherein the second seat has a continuous diameter and the fourth seat has a continuous diameter.

4. The clutch assembly of claim 1, wherein the outer surface of the spacer is interference fit to the third seat and the second bearing is interference fit to the inner surface of the spacer.

5. The clutch assembly of claim 1, wherein the first bearing has a smaller diameter than the second bearing.

6. The clutch assembly of claim 1, wherein the clutch element includes a cartridge and rollers supported by the cartridge, wherein an outer surface of the cartridge is disposed on the third seat and the rollers are disposed on the first seat.

7. The clutch assembly of claim 1, wherein the spacer further includes a radially extending side facing the clutch element and defining a circular channel.

8. The clutch assembly of claim 1, wherein the projection includes a chamfered leading edge.

9. A clutch assembly comprising:
an inner race defining first and second axially spaced seats;
an outer race circumscribing the inner race and defining third and fourth axially spaced seats;
a one-way clutch element radially disposed between the inner and outer races and disposed on the first and third seats;
a first bearing disposed on the second and fourth seats;
an annular spacer including an outer surface disposed on the third seat, wherein the spacer and the outer race include cooperating connection features to axially restrain the spacer relative to the outer race, wherein one of the connection features is a groove defined in the third seat and the other of the connection features is a projection disposed in the groove, wherein the projection extends radially outward from the outer surface of the spacer; and
a second bearing disposed on the first seat and on an inner surface of the spacer.

10. The clutch assembly of claim 9, wherein the projection defines a barb configured to engage with a radial wall of the groove.

11. The clutch assembly of claim 9, wherein the groove is circular.

12. The clutch assembly of claim 9, wherein the outer surface of the spacer is interference fit to the third seat and the second bearing is interference fit to the inner surface of the spacer.

13. The clutch assembly of claim 9, wherein the first bearing has a smaller diameter than the second bearing.

14. The clutch assembly of claim 9, wherein the clutch element includes a cartridge and rollers supported by the cartridge, wherein an outer surface of the cartridge is disposed on the third seat and the rollers are disposed on the first seat.

15. The clutch assembly of claim 9, wherein the spacer further includes a radially extending side facing the clutch element and defining a circular channel.

16. The clutch assembly of claim 9, wherein the second seat has a continuous diameter and the fourth seat has a continuous diameter.

17. A clutch assembly comprising:
inner and outer races supported for rotation about an axis, wherein the outer race includes an inner circumferential surface defining a recessed circular groove having a radially extending wall;
a one-way clutch element radially disposed between the inner and outer races;
a first bearing radially disposed between the inner and outer races and seated on the inner race;
a second bearing radially disposed between the inner and outer races; and
an annular spacer radially stacked with the second bearing and including a radially extending projection having a barb, wherein the projection is received within the groove with the barb abutting the radially extending wall to prevent axial movement of the spacer.

18. The clutch assembly of claim 17, wherein the spacer includes an outer circumferential surface having the projection thereon and disposed against the outer race and includes an inner circumferential surface disposed against the second bearing.

19. The clutch assembly of claim 18, wherein the outer surface of the spacer is interference fit to the outer race, and the second bearing is interference fit to the inner surface of the spacer.

20. The clutch assembly of claim 17, wherein the first and second bearing are disposed on opposite sides of the clutch element.

\* \* \* \* \*